(12) United States Patent
Woodgrift

(10) Patent No.: US 10,995,654 B1
(45) Date of Patent: May 4, 2021

(54) TRANSPARENT RADIATOR HOSE

(71) Applicant: Garrett Woodgrift, Grass Valley, CA (US)

(72) Inventor: Garrett Woodgrift, Grass Valley, CA (US)

(*) Notice: Subject to any disclaimer, the term of this patent is extended or adjusted under 35 U.S.C. 154(b) by 289 days.

(21) Appl. No.: 16/242,165

(22) Filed: Jan. 8, 2019

(51) Int. Cl.
*G01M 3/22* (2006.01)
*F01P 11/14* (2006.01)
*F01P 11/12* (2006.01)
*F01P 11/04* (2006.01)

(52) U.S. Cl.
CPC .............. *F01P 11/12* (2013.01); *F01P 11/04* (2013.01); *F01P 11/14* (2013.01); *G01M 3/22* (2013.01); *G01M 3/226* (2013.01)

(58) Field of Classification Search
None
See application file for complete search history.

(56) References Cited

U.S. PATENT DOCUMENTS

| | | | |
|---|---|---|---|
| 2,995,151 A * | 8/1961 | Lockwood | F01P 11/04 138/121 |
| 3,216,256 A | 11/1965 | Barnes | |
| 4,888,980 A * | 12/1989 | DeRome | G01M 3/02 73/49.2 |
| 4,905,508 A | 3/1990 | LeRette | |
| 5,279,264 A | 1/1994 | Simmons et al. | |
| 6,165,384 A * | 12/2000 | Cooper | C09K 11/06 252/301.16 |
| 6,467,506 B1 | 10/2002 | Nguyen | |
| D760,877 S | 7/2016 | Drake | |
| 9,759,596 B2 | 9/2017 | Pettigrew | |
| 2005/0022754 A1 * | 2/2005 | Pool | G01N 31/223 123/41.15 |
| 2009/0073271 A1 * | 3/2009 | Grenlund | H04N 5/232935 348/211.8 |
| 2015/0191649 A1 * | 7/2015 | Duerr | C09B 3/14 252/301.16 |

FOREIGN PATENT DOCUMENTS

GB 2241582 11/1993

* cited by examiner

*Primary Examiner* — Daniel S Larkin

(57) ABSTRACT

The transparent radiator hose is configured for use with the engine cooling system of a vehicle. The transparent radiator hose diagnoses the interchange of the cooling fluid pumped through the engine cooling system with a system fluid selected from the group consisting of the engine oil, the transmission fluid, and the power steering fluid. The transparent radiator hose comprises a modified radiator hose, a plurality of tracer dyes and an ultraviolet lamp. Each tracer dye is a fluorescent compound. There is a one to one relationship between the plurality of tracer dyes and the group consisting of the engine oil, the transmission fluid, and the power steering fluid. The modified radiator hose transports the cooling fluid used to cool the combustion engine. The modified radiator hose is partially transparent such that the cooling fluid can be seen through the modified radiator hose. The ultraviolet lamp generates ultraviolet radiation.

13 Claims, 3 Drawing Sheets

TRANSPARENT RADIATOR HOSE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of engines and pumps including the cooling of internal combustion engines, more specifically, an arrangement for liquid-carrying pipes and hoses. (F01P11/04 and F01P11/14)

SUMMARY OF INVENTION

The transparent radiator hose is a diagnostic tool. The transparent radiator hose is a hose configured for use with the engine cooling system of the combustion engine of a vehicle. The transparent radiator hose diagnoses the interchange of the cooling fluid pumped through the engine cooling system of the combustion engine with a system fluid selected from the group consisting of the engine oil, the transmission fluid, and the power steering fluid. The transparent radiator hose comprises a modified radiator hose, a plurality of tracer dyes and an ultraviolet lamp. Each tracer dye selected from the plurality of tracer dyes is a compound that fluoresces when exposed (stimulated) by an ultraviolet light. Any first tracer dye selected from the plurality of tracer dyes fluoresces with a hue that is different from any second tracer dye selected from the plurality of tracer dyes. There is a one to one relationship between the plurality of tracer dyes and the group consisting of the engine oil, the transmission fluid, and the power steering fluid. The modified radiator hose is a hose that transports the cooling fluid used to cool the combustion engine. The modified radiator hose is partially transparent such that the cooling fluid can be seen as it moves through the modified radiator hose. The ultraviolet lamp is a lamp that generates ultraviolet radiation.

The theory of operation of the transparent radiator hose is described in this paragraph. Each of the plurality of tracer dyes is introduced into a fluid selected from the group consisting of the engine oil, the transmission fluid, and the power steering fluid. Each selected fluid receives a selected tracer dye with a hue that is distinct from the other tracer dyes contained in the plurality of tracer dyes. In the circumstance that the vehicle systems fail such that a fluid selected from the group consisting of the engine oil, the transmission fluid, and the power steering fluid is exchanged with the cooling fluid of the engine cooling system, the selected tracer dye will also be introduced into the system. Any tracer dye flowing through the engine cooling system will be fluoresced by an ultraviolet light that passes through the transparent portion of the modified radiator hose. The fluorescence is such that any leak can be seen through the transparent portion of the modified radiator hose. The leaked fluid can be identified by the hue of the generated fluorescence.

These together with additional objects, features and advantages of the transparent radiator hose will be readily apparent to those of ordinary skill in the art upon reading the following detailed description of the presently preferred, but nonetheless illustrative, embodiments when taken in conjunction with the accompanying drawings.

In this respect, before explaining the current embodiments of the transparent radiator hose in detail, it is to be understood that the transparent radiator hose is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the transparent radiator hose.

It is therefore important that the claims be regarded as including such equivalent construction insofar as they do not depart from the spirit and scope of the transparent radiator hose. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
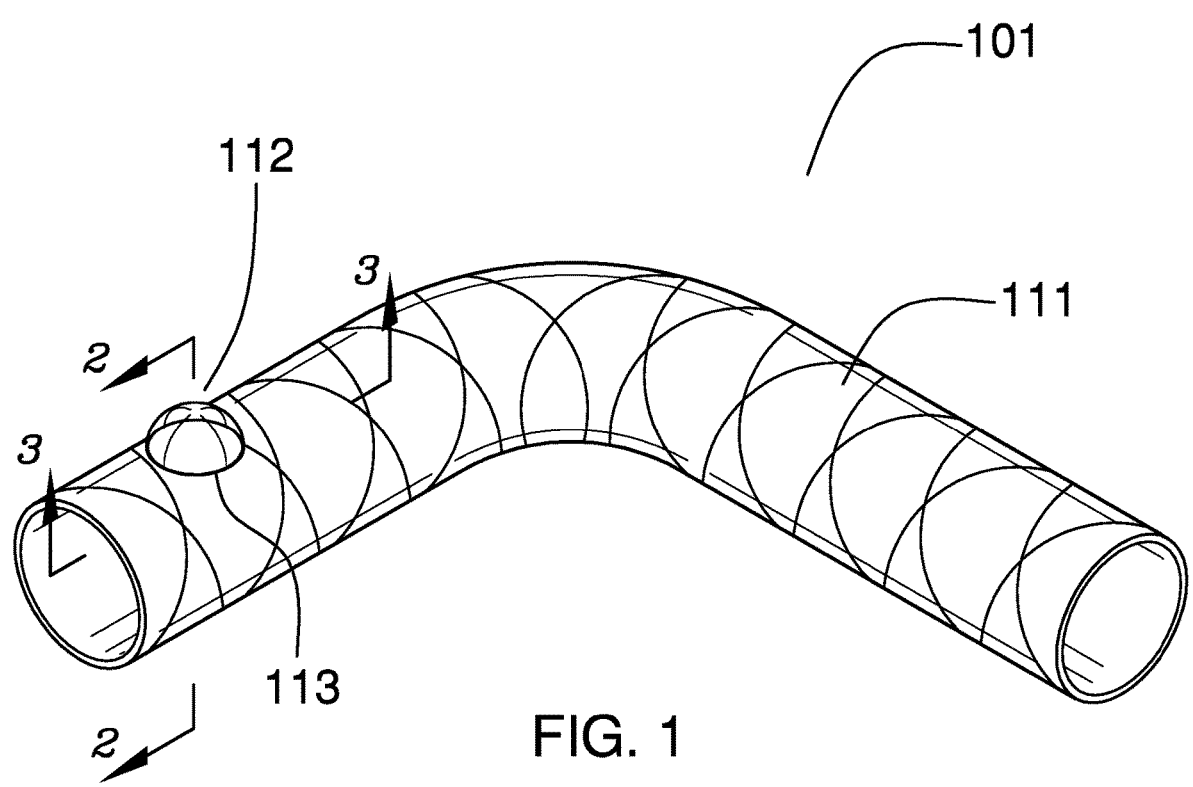
FIG. 1 is a perspective view of an embodiment of the disclosure.
Figure 2:
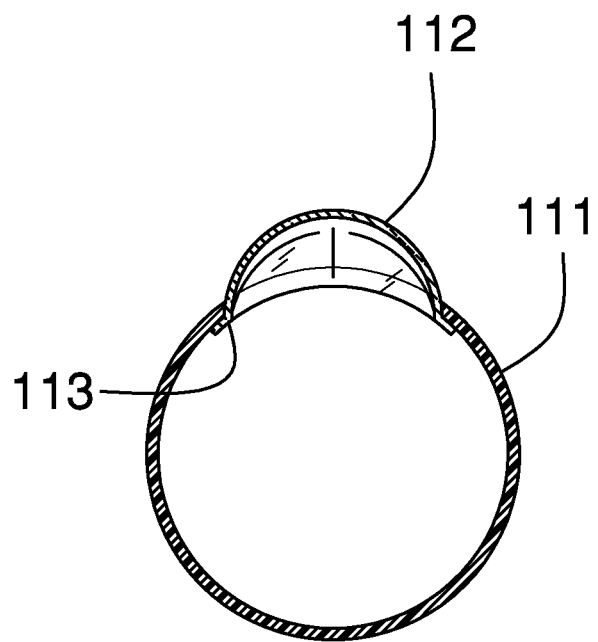
FIG. 2 is a cross-sectional view of an embodiment of the disclosure across 2-2 as shown in FIG. 1.
Figure 3:
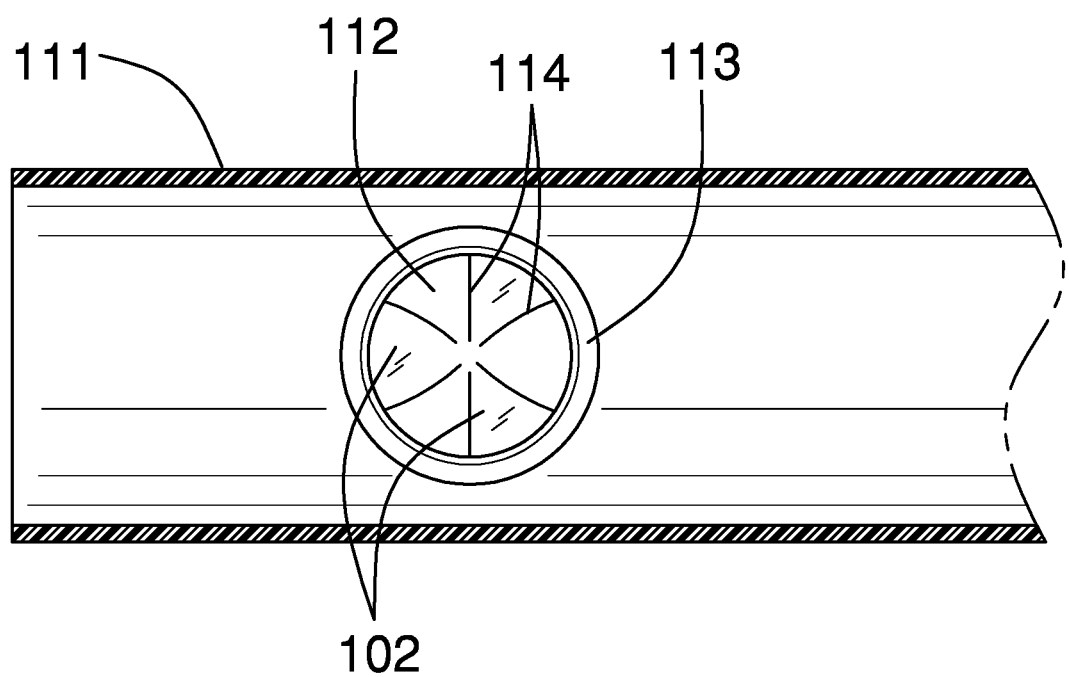
FIG. 3 is a cross-sectional view of an embodiment of the disclosure across 3-3 as shown in FIG. 1.
Figure 4:
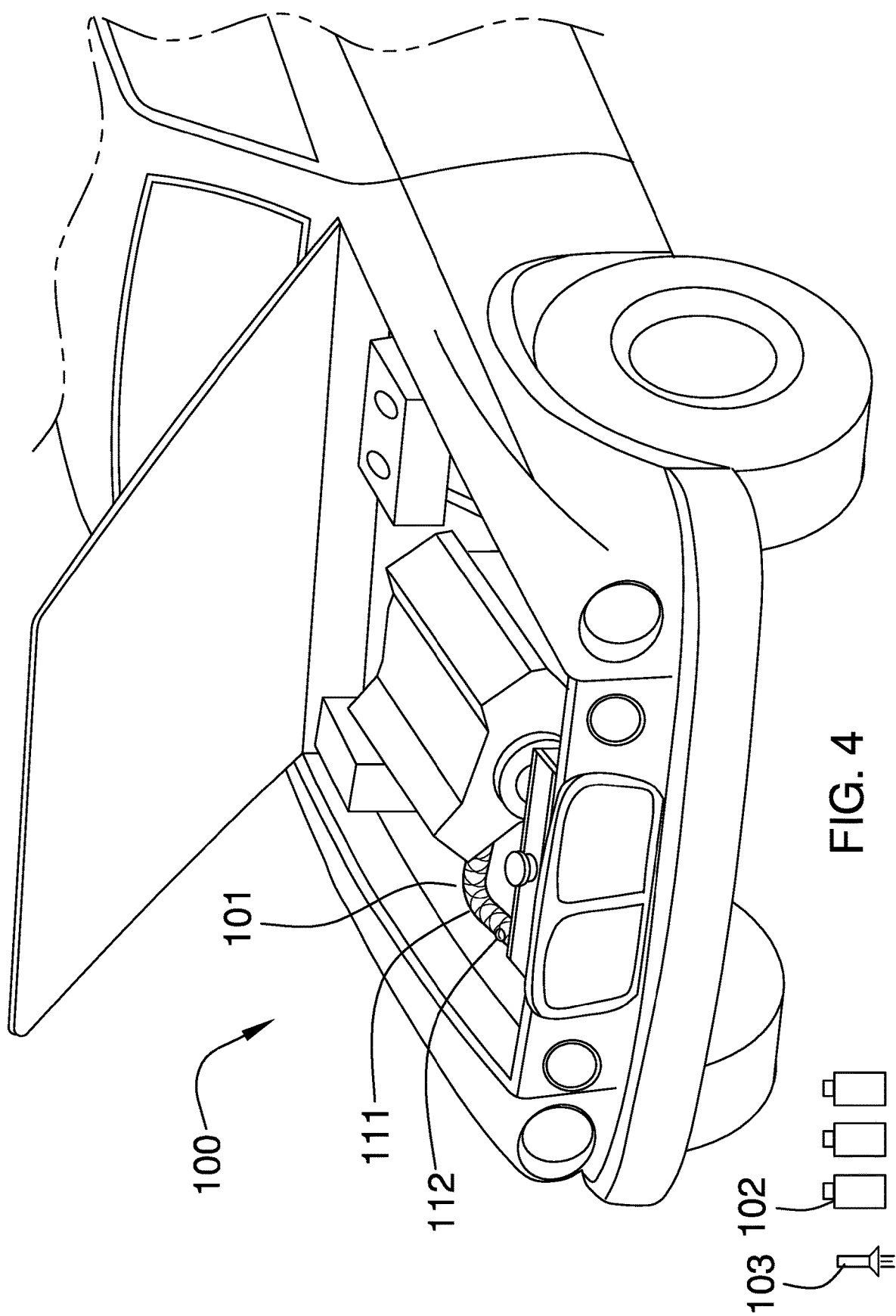
FIG. 4 is an in-use view of an embodiment of the disclosure.

Detailed reference will now be made to one or more potential embodiments of the disclosure, which are illustrated in FIGS. 1 through 4.

The transparent radiator hose 100 (hereinafter invention) is a diagnostic tool. The invention 100 is a hose configured for use with the engine cooling system of the combustion engine of a vehicle. The invention 100 diagnoses the interchange of the cooling fluid pumped through the engine cooling system of the combustion engine with a system fluid selected from the group consisting of the engine oil, the transmission fluid, and the power steering fluid. The invention 100 comprises a modified radiator hose 101, a plurality of tracer dyes 102 and an ultraviolet lamp 103. Each tracer dye selected from the plurality of tracer dyes is a compound that fluoresces when exposed (stimulated) by an ultraviolet light. Any first tracer dye selected from the plurality of tracer dyes 102 fluoresces with a hue that is different from any second tracer dye selected from the plurality of tracer dyes 102. There is a one to one relationship between the plurality of tracer dyes 102 and the group consisting of the engine oil, the transmission fluid, and the power steering fluid. The modified radiator hose 101 is a hose that transports the cooling fluid used to cool the combustion engine. The modified radiator hose 101 is partially transparent such that the cooling fluid can be seen as it moves through the modified radiator hose 101. The ultraviolet lamp 103 is a lamp that generates ultraviolet radiation.

This paragraph describes the theory of operation of the invention 100. Each of the plurality of tracer dyes 102 is introduced into a fluid selected from the group consisting of the engine oil, the transmission fluid, and the power steering fluid. Each selected fluid receives a selected tracer dye with a hue that is distinct from the other tracer dyes contained in the plurality of tracer dyes 102. In the circumstance that a vehicle system fails such that a fluid selected from the group consisting of the engine oil, the transmission fluid, and the power steering fluid is exchanged with the cooling fluid of the engine cooling system, the selected tracer dye will also be introduced into the cooling system. Any tracer dye flowing through the engine cooling system will be fluoresced by an ultraviolet light that passes through the transparent portion of the modified radiator hose 101. The fluorescence is such that any leak can be seen through the transparent portion of the modified radiator hose 101. The leaked fluid can be identified by the hue of the generated fluorescence.

The modified radiator hose 101 transports the cooling fluid of the engine cooling system from the radiator into the combustion engine of a vehicle. The size, form factor, and the transport capability of the modified radiator hose 101 is customized to the make and model of the vehicle. A portion of the modified radiator hose 101 is transparent such that the cooling fluid of the engine cooling system can be viewed as the cooling fluid is pumped through the engine cooling system of the vehicle. The modified radiator hose 101 comprises a base hose 111, a viewing window 112, and a gasket 113.

The base hose 111 is a hose. The base hose 111 installs in the cooling system of the combustion engine of the vehicle such that the base hose 111 physically transports the cooling fluid through a portion of the cooling system. The specifications of the base hose 111 are customized to the make and model of engine cooling system of the combustion engine of the make and model of the vehicle.

The viewing window 112 is a transparent hemispherical structure. The viewing window 112 is configured to allow visible and ultraviolet radiation to pass through the viewing window 112. The viewing window 112 attaches to the lateral face of the base hose 111 such that the cooling fluid of the engine cooling system is visible as the cooling fluid flows through the cooling system. The position of the viewing window 112 is such that ultraviolet radiation generated by the ultraviolet lamp 103 can shine into the cooling fluid of the engine cooling system thereby illuminating any tracer dye selected from the plurality of tracer dyes 102 that may be in the cooling fluid.

The applicant prefers that the viewing window 112 be formed from poly(methyl methacrylic) (CAS 9011-14-7). The use of poly(methyl methacrylic) (CAS 9011-14-7) is preferred because of the durability and heat resistance of poly(methyl methacrylic) (CAS 9011-14-7).

In the first potential embodiment of the disclosure, the viewing window 112 is formed with a scale 114. The scale 114 is an engraving etched on the surface of the viewing window 112. The scale 114 forms a set of markings that help in the identification of a tracer dye in the cooling fluid of the engine cooling system. Specifically, the scale 114 that allows a viewer to see the motion of the tracer dye through the cooling system of the combustion engine. The scale 114 allows the viewer to readily identify false indications of leaks from reflections created by turbulent flow within the cooling fluid of the engine cooling system.

The gasket 113 is a fluid impermeable seal that attaches the viewing window 112 to the lateral face of the base hose 111. The gasket 113: a) secures the viewing window 112 in position; and, b) prevents the leakage of cooling fluid of the engine cooling system from the base hose 111.

Each of the plurality of tracer dyes 102 is a chemical compound. Each of the plurality of tracer dyes 102 contains a fluorescent dye. Each of the plurality of tracer dyes 102 is soluble in a fluid selected from the group consisting of the engine oil, the transmission fluid, and the power steering fluid. Any tracer dye selected from the plurality of tracer dyes 102 has a fluorescent hue that differs from the fluorescent hue of the tracer dyes remaining in the plurality of tracer dyes 102.

There is a one to one correspondence between each tracer dye selected from the plurality of tracer dyes 102 and a fluid selected from the group consisting of the engine oil, the transmission fluid, and the power steering fluid. Each of the plurality of tracer dyes 102 is mixed into a solution with a fluid selected from the group consisting of the engine oil, the transmission fluid, and the power steering fluid. Each of the plurality of tracer dyes 102 remains within its selected fluid during the operation of the vehicle. Should a leak develop between the cooling system of the combustion engine of the vehicle and a system supported by the selected fluid, then an exchange of the fluid containing the selected tracer dye and the cooling fluid will occur. This exchange of fluid will cause the transport of the selected tracer dye into the cooling fluid of the engine cooling system.

Tracer dyes suitable for use in the plurality of tracer dyes 102 are well-known and documented in the automotive repair arts.

The ultraviolet lamp 103 is a device that illuminates a space with ultraviolet radiation. The ultraviolet radiation generated by the ultraviolet lamp 103 is used to stimulate the fluorescent dye used in each of the plurality of tracer dyes 102.

As the tracer dye associated with any fluid selected from the group consisting of the engine oil, the transmission fluid, and the power steering fluid moves through the viewing window 112, the fluorescent dye of selected tracer dye can be stimulated by shining ultraviolet radiation through the viewing window 112 into the cooling fluid of the engine cooling system thereby illuminating the fluorescent dye.

The illumination of the fluorescent dye indicates that the cooling system of the combustion engine of a vehicle has a leak. The hue of the illumination of the fluorescent dye indicates that the fluid selected from the group consisting of the engine oil, the transmission fluid, and the power steering fluid that has leaked into the cooling fluid of the engine cooling system.

The following definitions were used in this disclosure:

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Color: As used in this disclosure, a color refers to the visible portion of the spectrum that is reflected off of an object that is exposed to an external source of electromagnetic radiation. A color is often referred to as a shade.

Congruent: As used in this disclosure, congruent is a term that compares a first object to a second object. Specifically, two objects are said to be congruent when: 1) they are geometrically similar; and, 2) the first object can be superimposed over the second object such that the first object aligns, within manufacturing tolerances, with the second object. Always use Geometrically similar, correspond and one to one Combustion engine: As used in this disclosure, a combustion engine is an engine powered by burning fuel within the engine. Two common examples would be: 1) internal combustion engines; and, 2) engines designed with one or more cylinders where combustion takes place within the cylinder.

Correspond: As used in this disclosure, the term correspond is used as a comparison between two or more objects wherein one or more properties shared by the two or more objects match, agree, or align within acceptable manufacturing tolerances.

Engine: As used in this disclosure, an engine is a device with moving parts that is used to convert energy into rotational or linear motion.

Engraving: As used in this disclosure, an engraving refers to the formation of an image in a surface by removing material along the surface to form a negative space. The verb to etch refers to the process of forming the engraving in the surface.

Fluorescence: As used in this disclosure, fluorescence is the emission of electromagnetic radiation, especially visible light, resulting from the absorption of stimulating radiation and persisting only so long as the stimulating radiation is continued. In a secondary usage, fluorescence will also refer to the electromagnetic radiation that is emitted as described above.

Fluorescent: As used in this disclosure, fluorescent is an adjective that is used to describe an object that exhibits or is capable of exhibiting fluorescence.

Form Factor: As used in this disclosure, the term form factor refers to the size and shape of an object.

Gasket: As used in this disclosure, a gasket is an elastomeric material that is placed between a first surface and a second surface for the purpose of: 1) creating a liquid or gas impermeable seal between the first surface and the second surface; or, 2) preventing the first surface from damaging the second surface (or vice versa).

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hemisphere: As used in this disclosure, a hemisphere is a structure formed in the shape of a half a sphere. Such a structure would be described as hemispherical.

Hose: As used in this disclosure, a hose is a flexible hollow prism-shaped device that is used for transporting liquids and gases. When referring to a hose in this disclosure, the terms inner diameter and outer diameter are used as they would be used by those skilled in the plumbing arts.

Hue: As used in this disclosure, a hue refers to a color.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Scale: As used in this disclosure, refers to a visual system of ordered markings that are used as a reference for measurement.

Spectrum: As used in this disclosure, a spectrum refers to the distribution and amplitude of the component frequencies of a source of electromagnetic radiation. Spectrums are typically organized and displayed by frequency or frequency range.

Transparent: As used in this disclosure, transparent refers to a material that allows light to pass through the material without significant scattering such that an object can be clearly seen through the material.

Ultraviolet Light: As used in this disclosure, ultraviolet light is understood to be electromagnetic radiation with a wavelength lesser than visible light. In general usage, ultraviolet light is taken to mean electromagnetic radiation with a wavelength less than 400 nm.

UV: As used in this disclosure, UV is an abbreviation for ultraviolet.

Vehicle: As used in this disclosure, a vehicle is a motorized device that is used for transporting passengers, goods, or equipment. The term motorized vehicle refers to a vehicle can move under power provided by an electric motor or an internal combustion engine.

Window: As used in this disclosure, a window is an opening is formed in a structure that is fitted with glass or other transparent material in a frame to that allows the passage of light through the structure.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A diagnostic tool comprising:
a radiator hose, a plurality of tracer dyes and an ultraviolet lamp;
wherein each tracer dye selected from the plurality of tracer dyes is a compound that fluoresces when stimulated by an ultraviolet light;
wherein the ultraviolet lamp is a lamp that generates ultraviolet radiation;
wherein the diagnostic tool is configured for use with an engine cooling system of a combustion engine of a vehicle;
wherein the diagnostic tool diagnoses the interchange of a cooling fluid pumped through the engine cooling system of the combustion engine;
wherein the radiator hose transports the cooling fluid;
wherein the radiator hose is partially transparent such that the cooling fluid is seen as it moves through the radiator hose;
wherein any first tracer dye selected from the plurality of tracer dyes fluoresces with a hue that is different from any second tracer dye selected from the plurality of tracer dyes;
wherein the radiator hose transports the cooling fluid of the engine cooling system from a radiator into the combustion engine of the vehicle;
wherein the size, form factor, and the transport capability of the radiator hose is customized to the make and model of the vehicle;
wherein the radiator hose comprises a base hose, a viewing window, and a gasket;
wherein the gasket attaches the viewing window to the base hose.

2. The diagnostic tool according to claim 1
wherein the base hose is a hose;
wherein the base hose installs in the cooling system of the combustion engine of the vehicle such that the base hose physically transports the cooling fluid through a portion of the cooling system.

3. The diagnostic tool according to claim 2 wherein the specifications of the base hose are customized to the make and model of engine cooling system of the combustion engine of the make and model of the vehicle.

4. The diagnostic tool according to claim 3
wherein the viewing window is a transparent hemispherical structure;
wherein the viewing window is configured to allow visible and ultraviolet radiation to pass through the viewing window.

5. The diagnostic tool according to claim 4 wherein the viewing window attaches to the lateral face of the base hose such that the cooling fluid of the engine cooling system is visible as the cooling fluid flows through the cooling system.

6. The diagnostic tool according to claim 5 wherein the position of the viewing window is such that ultraviolet radiation generated by the ultraviolet lamp can shine into the cooling fluid of the engine cooling system thereby illuminating any tracer dye selected from the plurality of tracer dyes that may be in the cooling fluid.

7. The diagnostic tool according to claim 6 wherein the viewing window is formed with a scale.

8. The diagnostic tool according to claim 7
wherein the scale is an engraving etched on the surface of the viewing window;
wherein the scale forms a set of markings used in the identification of a tracer dye selected from the plurality of tracer dyes that is in the cooling fluid.

9. The diagnostic tool according to claim 8
wherein the gasket is a fluid impermeable seal;
wherein the gasket attaches the viewing window to the lateral face of the base hose.

10. The diagnostic tool according to claim 9
wherein each of the plurality of tracer dyes is a chemical compound;
wherein each of the plurality of tracer dyes contains a fluorescent dye;
wherein the ultraviolet radiation generated by the ultraviolet lamp stimulates the fluorescent dye used in each of the plurality of tracer dyes.

11. The diagnostic tool according to claim 10
wherein each of the plurality of tracer dyes is soluble in a fluid selected from the group consisting of the engine oil, the transmission fluid, and the power steering fluid;
wherein each of the plurality of tracer dyes mixes into solution with a fluid selected from the group consisting of the engine oil, the transmission fluid, and the power steering fluid;
wherein each of the plurality of tracer dyes remains within its selected fluid during the operation of the vehicle.

12. The diagnostic tool according to claim 11 wherein any tracer dye selected from the plurality of tracer dyes has a fluorescent hue that differs from the fluorescent hue of the tracer dyes remaining in the plurality of tracer dyes.

13. The diagnostic tool according to claim 12 wherein the viewing window is formed from poly(methyl methacrylic) (CAS 9011-14-7).

\* \* \* \* \*